United States Patent
Chu et al.

(10) Patent No.: US 7,809,729 B2
(45) Date of Patent: Oct. 5, 2010

(54) MODEL REPOSITORY

(75) Inventors: Chengwen Robert Chu, Cary, NC (US); Susan Christine Tideman, Durham, NC (US)

(73) Assignee: SAS Institute Inc., Cary, NC (US)

(*) Notice: Subject to any disclaimer, the term of this patent is extended or adjusted under 35 U.S.C. 154(b) by 415 days.

(21) Appl. No.: 11/179,755

(22) Filed: Jul. 12, 2005

(65) Prior Publication Data

US 2005/0251525 A1 Nov. 10, 2005

Related U.S. Application Data

(63) Continuation of application No. 09/668,077, filed on Sep. 22, 2000, now Pat. No. 6,920,458.

(51) Int. Cl.
*G06F 7/00* (2006.01)
*G06F 17/30* (2006.01)

(52) U.S. Cl. .......................... 707/741; 703/3; 715/700

(58) Field of Classification Search ................ 707/100; 703/3; 715/700
See application file for complete search history.

(56) References Cited

U.S. PATENT DOCUMENTS

| | | |
|---|---|---|
| 5,021,992 A | 6/1991 | Kondo |
| 5,101,374 A * | 3/1992 | Sinutko, Jr. .................. 711/163 |
| 5,257,185 A | 10/1993 | Farley et al. |
| 5,377,308 A | 12/1994 | Inoue et al. |
| 5,579,441 A | 11/1996 | Bezek et al. |
| 5,649,190 A | 7/1997 | Sharif-Askary et al. |
| 5,682,539 A | 10/1997 | Conrad et al. |
| 5,692,107 A * | 11/1997 | Simoudis et al. ............... 706/12 |
| 5,787,425 A * | 7/1998 | Bigus ........................... 707/6 |
| 5,832,450 A | 11/1998 | Myers et al. |
| 5,838,907 A | 11/1998 | Hansen |
| 5,842,197 A | 11/1998 | Ho |
| 5,845,278 A | 12/1998 | Kirsch et al. |
| 5,911,074 A | 6/1999 | Leprince et al. |
| 5,978,811 A | 11/1999 | Smiley |
| 6,003,039 A | 12/1999 | Barry et al. |
| 6,078,918 A | 6/2000 | Allen et al. |

(Continued)

FOREIGN PATENT DOCUMENTS

WO      9913427      3/1999

(Continued)

OTHER PUBLICATIONS

Salton, Gerard et al., "Automatic text structuring and retrieval-experiments in automatic encyclopedia searching", Sep. 1991, ACM Press, p. 21-30.*

(Continued)

*Primary Examiner*—Kuen S Lu
*Assistant Examiner*—Sabana Rahman
(74) *Attorney, Agent, or Firm*—Jones Day

(57) ABSTRACT

A model repository is provided for storing selected data models generated by a data mining application. The model repository may include one or more index data structures for storing attributes of the models within the model repository. A user may then search through the one or more indexes in order to find a model that suits his or her needs.

15 Claims, 10 Drawing Sheets

U.S. PATENT DOCUMENTS

| | | | |
|---|---|---|---|
| 6,102,958 | A | 8/2000 | Meystel et al. |
| 6,167,405 | A | 12/2000 | Rosensteel et al. |
| 6,182,079 | B1 | 1/2001 | Lenzie |
| 6,189,005 | B1 | 2/2001 | Chakrabarti et al. |
| 6,202,159 | B1 | 3/2001 | Ghafir et al. |
| 6,212,526 | B1 * | 4/2001 | Chaudhuri et al. .......... 707/102 |
| 6,236,978 | B1 | 5/2001 | Tuzhilin |
| 6,240,411 | B1 | 5/2001 | Thearling |
| 6,263,337 | B1 | 7/2001 | Fayyad et al. |
| 6,263,341 | B1 | 7/2001 | Smiley |
| 6,327,698 | B1 | 12/2001 | Kolluru |
| 6,349,306 | B1 | 2/2002 | Malik et al. |
| 6,374,252 | B1 | 4/2002 | Althoff et al. |
| 6,381,605 | B1 | 4/2002 | Kothuri et al. |
| 6,405,366 | B1 | 6/2002 | Lorenz, Sr. et al. |
| 6,411,961 | B1 * | 6/2002 | Chen .......................... 707/102 |
| 6,449,612 | B1 | 9/2002 | Bradley et al. |
| 6,470,333 | B1 * | 10/2002 | Baclawski ..................... 707/3 |
| 6,473,758 | B1 | 10/2002 | Schwartz et al. |
| 6,549,907 | B1 * | 4/2003 | Fayyad et al. ............... 707/101 |
| 6,553,366 | B1 * | 4/2003 | Miller et al. .................... 707/2 |
| 6,629,095 | B1 * | 9/2003 | Wagstaff et al. ............... 707/5 |
| 6,782,391 | B1 | 8/2004 | Scher |
| 6,920,458 | B1 | 7/2005 | Chu et al. |
| 2002/0078064 | A1 * | 6/2002 | Bisgaard-Bohr et al. 707/103 R |
| 2003/0004912 | A1 | 1/2003 | Pant et al. |
| 2003/0058277 | A1 * | 3/2003 | Bowman-Amuah ......... 345/765 |

FOREIGN PATENT DOCUMENTS

| | | |
|---|---|---|
| WO | 0133464 | 5/2001 |
| WO | 03005232 | 1/2003 |

OTHER PUBLICATIONS

Chen, Ming-Syan et al., "Data Mining: An Overview from a Database Perspective," IEEE Transactions on Knowledge and Data Engineering, IEEE Inc., New York, US, vol. 8, No. 6, pp. 866-883, Dec. 1996.

Manganaris, Stefanos et al., "A data mining analysis of RTID alarms," Computer Networks, Elsevier Science Publishers B.V., Amsterdam, NL, vol. 34, No. 4, pp. 571-577, Oct. 2000.

Saharia et al., "Enhancing Data Warehouse Performance Through Query Caching," ACM SIGMIS Database, vol. 31, Issue 3, pp. 43-63, Jun. 2000.

Press Release, "SPSS Unveils Aggressive Development Plans—1999 product releases will focus on scalability and deployment solutions for the enterprise," Feb. 18, 1999 (4 pp.).

Press Release, "Department of Health and Human Services to provide employees with SPSS data analysis software—SPSS influence increases as it lands another large government deal," Apr. 13, 1999 (2 pp.).

Press Release, "SPSS ships data mining and data analysis software for AS/400 users—Data preparation, report OLAP and advanced statistics complement IBM's Intelligent Miner," Jun. 30, 1999 (3 pp.).

Press Release, "SPSS Inc. delivers enterprise-strength data mining—Two new products give users dramatically improved performance with large data sets," Sep. 30, 1999 (3 pp.).

Press Release, "SPSS introduces market research Web reporting solutions—New tools for automatic, real-time analysis and online reporting available now," Feb. 7, 2000 (2 pp.).

Press Release, "SPSS ships SmartViewer Web Server 2.0—Software enables enterprise-wide distribution of and interaction with SPSS analytical reports," Sep. 11, 2000 (3 pp.).

* cited by examiner

Fig. 3 (26, 40)

| MODEL'S FOLDER NAME | ATTRIBUTE A1 | ATTRIBUTE A2 | ATTRIBUTE A3 | ... | ATTRIBUTE M1 |
|---|---|---|---|---|---|
| 000_A000072_MODEL | VALUE | VALUE | VALUE | ... | VALUE |
| 002_A0000XH_MODEL | VALUE | VALUE | VALUE | ... | VALUE |
| 001_A0000FD_MODEL | VALUE | VALUE | VALUE | ... | VALUE |
| ... | ... | ... | ... | ... | ... |

| MODEL'S FOLDER NAME | SPLITTING VARIABLE SV1's NAME | SPLITTING VARIABLE SV2's NAME | SPLITTING VARIABLE SV3's NAME | ... | SPLITTING VARIABLE M2's NAME |
|---|---|---|---|---|---|
| 000_A000072_MODEL | Y | N | Y | ... | N |
| 001_A0000FD_MODEL | N | N | N | ... | N |
| ... | ... | ... | ... | ... | ... |

| MODEL'S FOLDER NAME | SPLITTING VARIABLE'S NAME |
|---|---|
| 000_A000072_MODEL | SPLITTING-VARIABLE-SV1's NAME |
| 000_A000072_MODEL | SPLITTING-VARIABLE-SV3's NAME |
| 000_A000072_MODEL | SPLITTING-VARIABLE-SV6's NAME |
| 000_A000072_MODEL | SPLITTING-VARIABLE-SV13's NAME |
| 001_A0000FD_MODEL | SPLITTING-VARIABLE-SV6's NAME |
| 001_A0000FD_MODEL | SPLITTING-VARIABLE-SV16's NAME |
| ... | ... |

(64, 62)

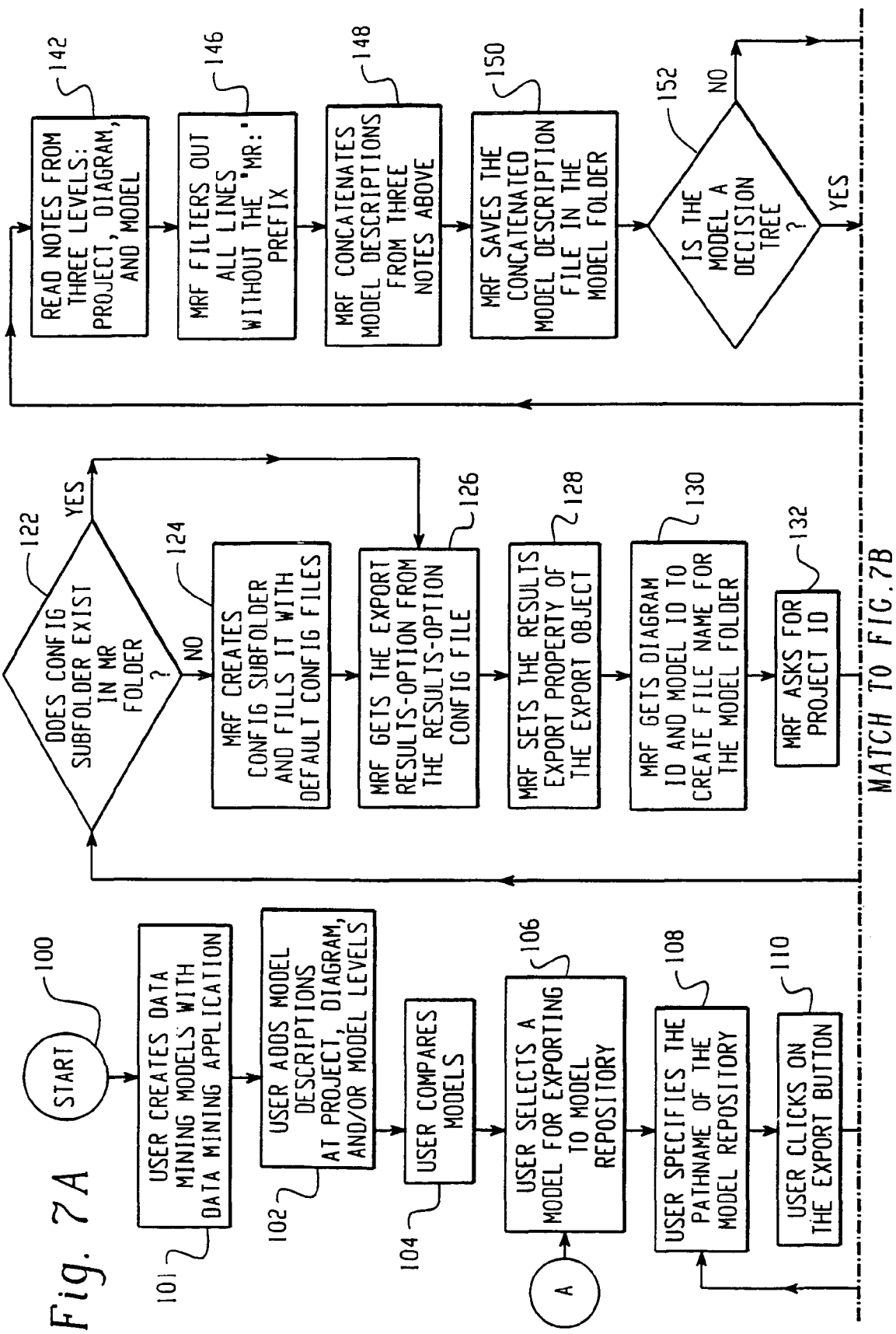

MODEL REPOSITORY

CROSS-REFERENCE TO RELATED APPLICATION

This application claims priority to and is a continuation of U.S. patent application Ser. No. 09/668,077 filed on Sep. 22, 2000. By this reference, the full disclosure, including the drawings, of said U.S. patent application is incorporated herein.

BACKGROUND

1. Technical Field

The present invention is directed to the fields of data warehousing, data mining, and data modeling. More specifically, the present invention provides a model repository for use in creating, storing, organizing, locating, and managing a plurality of data models.

2. Description of the Related Art

Modern business enterprises generate large amounts of data concerning the operation and performance of their businesses. This data is typically stored within a large data warehouse, or some other large database infrastructure. Business analysts then review this voluminous data in order to make business recommendations. The data may be analyzed manually, in order to develop an intuition about the data, or to pick up patterns in the data, or it may be analyzed using statistical software to determine trends, clusters of data, etc.

More recently, with the explosion of Internet-related traffic, business enterprises are generating volumes of data that are one or more orders of magnitude larger than before. This increase in scale has made it almost impossible to develop an intuition about the data or to pick up patterns in the data by simply examining the data in its original form. Similarly, this increase in scale has made it difficult to manually execute separate statistical analyses on the data.

As a result of this data explosion, data mining software has been developed. A data mining software application can search through the large volumes of data stored in the data warehouse and can identify patterns in the data using a variety of pattern-finding algorithms. These patterns are then used by the business analyst in order to make business recommendations. An example of such a data mining tool is Enterprise Miner™, available from SAS Institute, Inc., of Cary, N.C.

Each run of the data mining software is based on a specification. Part of the specification indicates which input data to use from the data warehouse. Another part of the specification activates one or more of the pattern-finding algorithms that are built into the data mining software. Other parts of the specification specify how to partition the data, how to assess the results, etc.

When the data mining tool is executed according to a particular specification, it generates a resulting analysis that is termed a model. The model contains information regarding the specification used for the run, including the name and location of the data set in the data warehouse that was analyzed, and also contains the resulting analysis, including any patterns that may have been detected in the data set. The model may also contain information regarding how well the pattern represents the analyzed data.

Over time, an enterprise having such a data mining tool may generate a multitude of different models, based on different input data, different data sampling techniques, different data partitions, different data mining algorithms, different assessment methods, etc. Not all of these models are useful, however. For example, some of the models may be better than others at predicting a particular outcome. Some of the models may be out of date. And some may not provide any useful results at all, or may not be able to predict any patterns in the data.

Typically, each person who generates models (i.e., a model creator) manually keeps track of his or her own collection of models. Thus, models are scattered around the enterprise—wherever anyone who is generating models happens to reside. There is no straightforward way for people who want to use models to know which ones (other than their own) are available and to find the one(s) appropriate for a given purpose. Tracking down or duplicating the generation of appropriate model(s) requires extensive human resources and time.

Thus, a problem with these types of data mining systems is the inability to effectively manage the multitude of data models that are generated, and the corresponding inability to distinguish useful models from those that have limited utility. This problem is amplified when the models are generated and used by a large number of users. If the models are generated and used by only one person, or a handful of persons, then the person (or persons) generally has a good idea of which models are available and may also have a cheat-sheet for which model is associated with certain specifications, patterns, or other results. When a large number of persons are generating models, however, each model generator (or creator) would have less of a sense of which models are available, and which ones are useful. In this latter situation, a particular model creator could duplicate much of the work that may have already been done by another model creator because he or she did not know that the model, or something very close to it, had already been developed by the other model creator. In addition, people that use the models, but do not necessarily create them, typically have no idea which models are useful, up to date, or otherwise applicable to a particular analysis, or would yield a particular result.

Thus, there remains a general need in this field for a system and method for creating, storing, organizing, locating and managing a plurality of models generated by a data mining application or other application.

SUMMARY

A model repository is provided for storing models generated by a data mining application or other application. The model repository is a structure that may be organized into a plurality of levels, including a project level, a diagram level, and a model level. The project level may include one or more diagrams, each of which describes a particular set of model specifications. Each diagram may then be associated with one or more models. Associated with the model repository is a model repository facility that is preferably integrated into the data mining application and enables operations, such as the exportation of useful models to the model repository. The model repository may also include one or more index data structures for storing attributes of the models within the model repository. These indexes may include a main index that describes the attributes of all the models stored in the model repository, and one or more special indexes, such as a tree-type index and mini-index, that describe the attributes of a particular sub-set of the models stored in the model repository. A user may then search through the one or more indexes in order to find a model that suits his or her needs. Alternatively, a user application program may automatically query the model repository in order to find and extract information from a particular model stored in the model repository.

According to one aspect of the present invention, a model repository system is provided that includes: (1) a data structure for storing a plurality of data records; (2) a data mining application for analyzing the data records and for generating a plurality of data models; and (3) a model repository for storing the data models, wherein the model repository includes one or more index structures containing a plurality of attributes that describe the data models.

According to another aspect of the present invention, a data modeling method is provided. This method includes the following steps: (a) generating a plurality of data models using a data mining application; (b) storing the plurality of generated data models in a database associated with the data mining application; (c) selecting one or more of the plurality of generated data models; (d) exporting the selected data models from the database to a model repository; and (e) generating one or more indexes of the data models stored in the model repository based upon a plurality of attributes associated with each of the selected data models.

Still another aspect of the present invention provides a data modeling method, comprising the steps of: (i) associating one or more attributes with each of a plurality of data models; (ii) exporting selected data models to a model repository; (iii) generating one or more index structures comprising the one or more attributes of each of the data models in the model repository; and (iv) providing a search mechanism and a retrieval mechanism for searching the one or more index structures in order to retrieve one or more data models from the model repository.

It should be noted that these are just some of the many aspects of the present invention. Other aspects not specified will become apparent upon reading the detailed description of the preferred embodiment set forth below.

BRIEF DESCRIPTION OF THE DRAWINGS

FIG. 3 is a preferred data structure for a main index that is part of the model repository shown in FIG. 1;

FIG. 4 is a preferred data structure for a tree-type index that is part of the model repository shown in FIG. 1;

FIG. 5 is an alternative data structure for the tree-type index that is part of the model repository shown in FIG. 1;

FIGS. 7A-7C are flow charts showing a preferred series of steps for exporting a model to the model repository shown in FIG. 1.

DETAILED DESCRIPTION OF THE DRAWINGS

Figure 1:
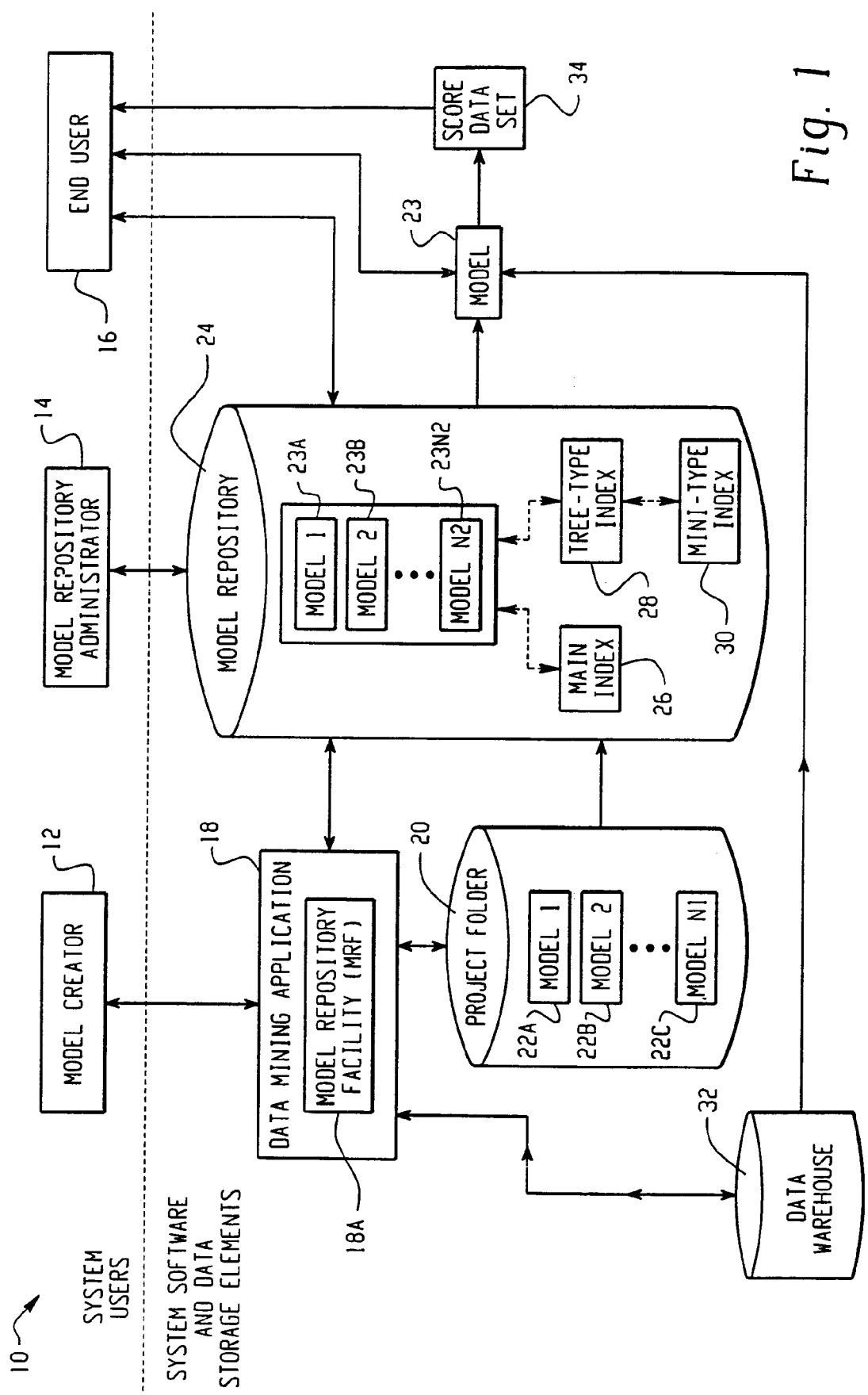
FIG. 1 is a system diagram showing a preferred implementation of a model repository for use with a data mining application.

Turning now to the drawings, FIG. 1 is a system diagram 10 showing a preferred implementation of a model repository 24 for use with a data mining application 18. The data mining application may be, for example, Enterprise Miner™, from SAS Institute, Inc. of Cary, N.C. Alternatively, other types of data mining programs could also be utilized with the model repository 24. The preferred implementation of a model repository is a folder. The data mining application 18 preferably includes an integrated model repository facility (MRF) application 18A, which, as described in more detail below, controls the exportation of models to the model repository 24, and the construction of one or more model indexes 26, 28, and 30. Alternatively, however, the MRF 18A could be a stand-alone application, in which case it would not be integrated into the data mining application 18.

The data mining application 18 analyzes data records stored in a data warehouse 32, or some other form of data storage facility. Although a single data warehouse 32 is shown in FIG. 1 for storing the data records, the data analyzed by the data mining application 18 could be spread out among numerous data warehouses 32 or numerous other database systems.

As described above, the data mining application 18 is executed using a particular model specification. This model specification typically indicates which input data to analyze from the data warehouse 32, which pattern-finding algorithm (such as a neural network, decision tree, etc.) to use for the analysis, how to partition the data, how to assess the results from the analysis, etc. The resulting analysis that is generated by the data mining application 18 when executed according to the specification is the model.

A data model, as generated, is a set of attributes related to the run of a data mining application or another type of statistical-related software application. For example, the attributes include the location of the input data, the scoring code, the fit statistics, and so on. However, it should be understood that data models can be generated by applications other than a data mining application, such as by a statistical modeling software application.

The models 22A, 22B, 22C that are generated by the data mining application 18 are initially stored in individual project folders 20. For example, each model creator 12 may have his or her own project folder stored in a database of project folders 20. The model creators 12 would then store their own models 22A, 22B, 22C in their individual project folders.

Using the model repository facility 18A, certain useful ones of the generated models 22A, 22B, or 22C can be selected and exported into the model repository 24. These useful models can then be searched for and retrieved manually by end-users 16, or programmatically by end-user applications 16. As described in more detail with reference to FIG. 2, the models 23A, 23B, 23N2 stored in the model repository 24 are organized according to a plurality of logical levels, including a project level, a diagram level, and a model level. The project level may include one or more diagrams, each of which describes a particular set of model specifications. Each diagram at the diagram level may then be associated with one or more individual models at the model level.

With reference back to FIG. 1, for each level of the model repository structure, one or more additional descriptive attributes may be associated with the models. The attributes provide descriptive information about the model that can be used to identify a particular model in the model repository 24 via a search and retrieval process. These attributes may be automatically associated with the models by the data mining application 18, or by the model repository facility 18A when the model is exported to the model repository 24. In addition, any of the system users 12, 14, 16 may associate additional attributes with the models. The model attributes may be assigned at the project level, the diagram level, or at the individual model level.

These model attributes are then organized and structured into one or more indexes 26, 28, 30, which are also stored in the model repository 24. These indexes may include a main type index 26, which includes some or all of the attributes for each of the models 23A, 23B and 23N2 in the model repository 24, and/or may include one or more special indexes, such as a tree-type index 28, which includes the attributes for a sub-set of all the models stored in the model repository 24.

For example, the tree-type index 28 would include certain attributes of those models that were generated using a decision-tree algorithm. The decision-tree algorithm generates a type of attribute known as splitting variables, which are stored in the tree-type index 28. Also shown in FIG. 1 is a mini-index 30, which provides a quick-search capability for the tree-type index 28. These various indexes are used by end users 16, or by end user applications 16, in order to find a particular model, or set of models, within the model repository by executing a search and retrieval operation on the attributes stored in the indexes 26, 28, 30.

A variety of system users can interact with the data mining application 18 and the model repository 24, including a model creator 12, a model repository administrator 14, and an end-user 16. The model creator 12 is the person who operates the data mining application 18 in order to generate a particular model. The model creator 12 determines the specifications for a particular data mining run, generates the corresponding model based on the specification, and then stores the model in his or her individual project folder 20. Alternatively, the model creator 12 could take an existing model from one of the project folders 20, modify the specification in some manner, and then generate a new model. Moreover, because the data in the data warehouse 32 typically changes over time, a model creator 12 can use the same specification against a later version of the data to generate a new model based on the updated data. The model creator 12 may then utilize the MRF 18A to export certain useful models to the model repository 24.

The model repository administrator 14 performs a variety of functions. One of these functions is to control access to the model repository 24. This may include controlling access rights to certain users, such as read access rights and write access rights. In this manner, the model repository administrator 14 can control which users can add or over-write models in the model repository (those having write access) and which users can only read models (those having only read access). The model repository administrator 14 may also control the process of deleting models from the model repository. Control of model deletion is important to ensure that a user with write access does not inadvertently delete a useful model from the model repository 24. In addition, the model repository administrator 14 may also determine which model attributes will be included in the main index 26.

The end-user 16 is the person who is interested in using the models in the model repository 24. The end-user 16 could also be a model creator 12, although not all end-users will be creating models. The end-user 16 accesses the model repository 24 and searches for an appropriate model 23A, 23B, 23N2 by examining the one or more index structures 26, 28, 30. By supplying search parameters and then comparing these search parameters against the attributes stored in the index structures, the end-user 16 is able to find one or more useful models. Having found a useful model, the end-user 16 may then obtain a copy of the information contained in the model. A special graphical user interface could be provided to the end-user 16 in order to facilitate the search and retrieval process with the model repository 24. The graphical user interface can be used to send a search and/or retrieval request to the model repository 24 over a network, such as a local, wide area, or global (e.g., Internet) network.

The end-user 16 may also be an end-user application program that programmatically searches for and retrieves an appropriate model from the model repository 24. The end-user application program can send a search and/or retrieval request to the model repository 24 over a network, such as a local, wide area, or global (e.g., Internet) network. This search and retrieval capability makes it possible to automate the deployment of models for specific purposes. For example, suppose that part of the operation of an application requires that it find a "best" model (perhaps based on the one with the best assessment results). Or suppose that part of the operation requires it to choose a model from many similar ones (perhaps based on the one that was most recently generated from certain input data). That part of the operation can be accomplished automatically using the indexes 26, 28, 30 to find the one or more models 23, and then by employing some type of comparison algorithm in order to determine which model is most suitable for the particular task. For example, the comparison algorithm could look for the model with the lowest rate of misclassification. The ability to search for a model or models programmatically is particularly important in real-time applications, such as web-based applications, because a person could not find the appropriate model or models fast enough to suit the real-time nature of the task. The selected model then could be used by the end user 16, for example to generate scored data 34.

In addition, with the appropriate access level, an end-user 16 could from time-to-time make a copy of the index(es) 26, 28, 30 and modify them in order to improve performance. Search and retrieval performance on the indexes would be improved because the modified copies would be stored locally to the end-user, and because the copies could contain only the rows and columns of the index structure needed for his or her purpose. In this manner, each end-user 16 could maintain his or her own index structures for the model repository 24.

Although a single model repository 24 is shown in FIG. 1, this is just one example of a system 10 employing the invention. Alternatively, a particular business enterprise may have more than one model repository 24. In addition, a given model repository 24 may have more than one main-type index 26, or more than one special-type indexes 28, 30. For example, the marketing group of a particular business could have their own main index structure 26 that is based on the model attributes that matter for their purposes, and the sales group could have their own main index structure 26 that is based on other model attributes that matter for their purposes. Although a particular model repository 24 may have more than one special-type index 28, it is preferable that for the particular type of special-type index, such as the tree-type index 28 and mini-index 30, there would be only one of that type of index for each model repository 24.

Figure 2:
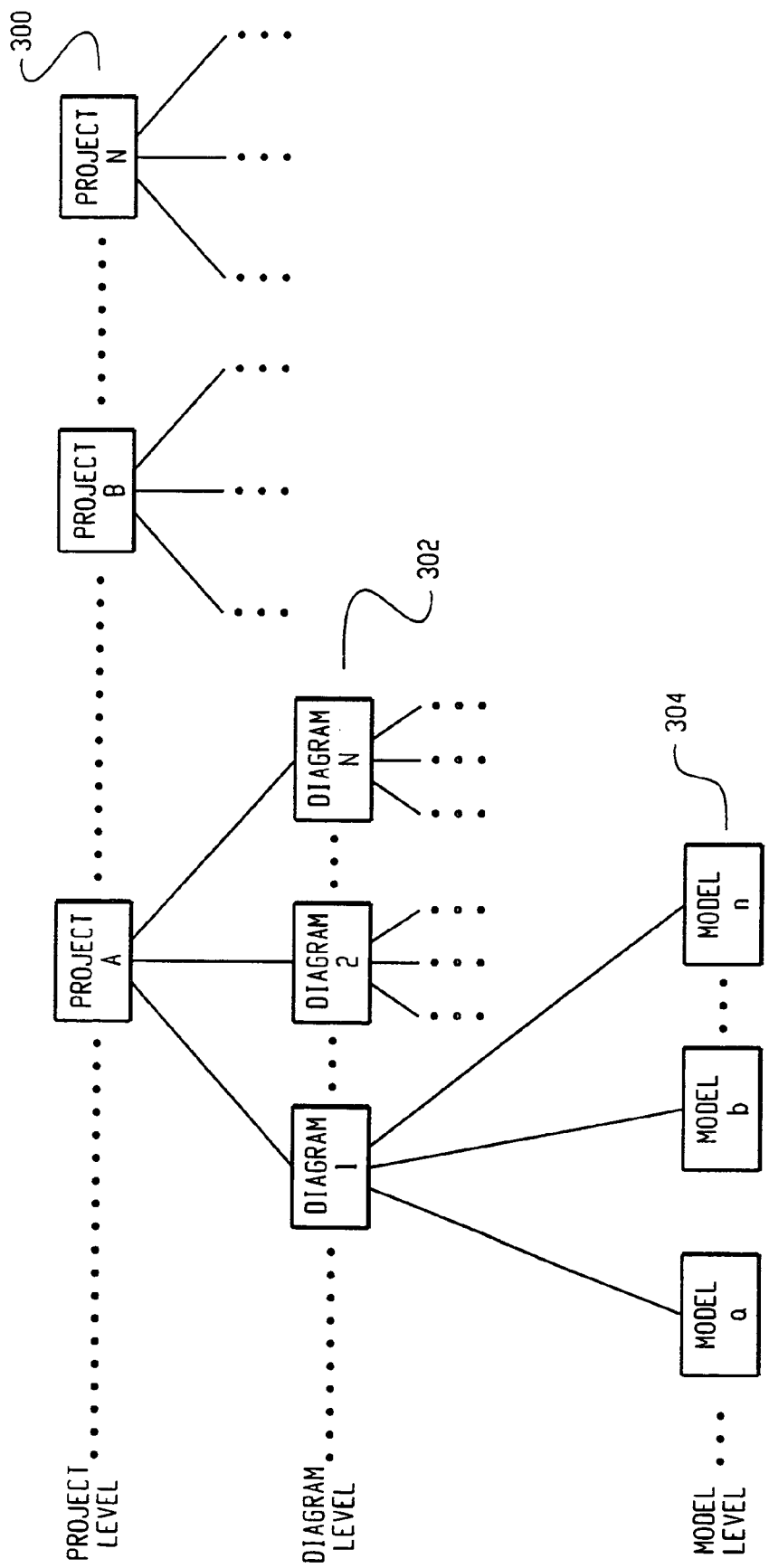
FIG. 2 is a diagram showing a preferred structure for storing models within the model repository.

FIG. 2 is a diagram showing a preferred structure for storing models within the model repository 24. According to this preferred structure, the model repository 24 is organized into three levels, the project level 300, the diagram level 302, and the model level 304. Each project, for example Project A, at the project level 300, may refer to one or more diagrams at the diagram level 302. Each diagram, such as Diagram 1, may then refer to one or more individual models at the model level 304.

Using this structure, multiple data mining projects can be associated with the same model repository 24, multiple data mining diagrams can be associated with the same project, and multiple models can be associated with the same diagram. A diagram represents the specifications for a data mining run. There are typically groups of specifications, such as those related to the input data, the sampling technique, the data partitions, the data mining algorithm, the assessment methods, etc. More than one model may be associated with each of these diagrams. For example, although the specification may be the same for two models, there may be some attribute of the models that is different, such as when the model was run, that will result in a different model based on the same specification.

The first time that a request is received by the MRF 18A to export a model to the model repository 24 for a given project, a folder is created at the project level 300 for that project. The name of the project-level folder preferably identifies the current date and time and the last three characters of the requestor's user identification. For example if the current time was 19May 2000:16:15:40 and the model export request was made by a person with the user identification "abc," then the name of the new project-level folder would be "2000_05_ 19_16_15_40_abc_project". Note, however, that this is just one way to determine the name for the project-level folders, and other methods could certainly be utilized.

The first time that a diagram is encountered within a particular project, the diagram is given a sequential number, such as 000, 001, 002, 003, . . . , etc. For a given diagram, there could be multiple models. For example, suppose the input data is sales records. If the diagram is used once a month, there will be one model each month. If every month's model is worth saving, every month the model repository 24 receives an additional model that is associated with that diagram of that project. Within a given project and diagram, there is thus a one-to-many relationship between the diagram and its models (and between the project and its diagrams).

The name of the model's folder preferably identifies the diagram with which the model is associated (i.e., 000, 001, 002, 003, . . . , etc.) and also preferably identifies the model itself. Each model preferably has a model-identification that is unique within the diagram and unique within the project.

The above description sets forth the coarse organization of the model repository 24. The coarse organization is provided by project-id, diagram-number, and model-id. Although these identifiers provide a useful way to identify a model, a general search is likely to require a finer level of granularity. In order to provide this finer level of granularity, the present invention introduces the concept of model attributes. Some attributes are automatically generated and associated with the models in the project folder 20 by the data mining application 18. If permitted by the export-results option, these attributes are associated with the models in the model repository 24 by the model repository facility 18A. The MRF 18A also generates attributes that it associates with the models in the model repository 24.

Model descriptors are additional attributes that are associated with the models in the model repository 24, and also may be used in the main index 26, which can be searched by a user in order to find and retrieve a particular model 23 or set of models. Descriptors can be assigned at the project level, the diagram level, and/or at the model level. Descriptors can be manually associated with the models in the project folder 20 by any of the system users 12, 14, 16. A descriptor preferably includes a variable-value pair, such as "site=Chicago" or "size=100,000". In these examples, site is a variable and Chicago is its value, and size is a variable and 100,000 is its value. The variable-value pairs may be manually specified by one of the system users 12, 14, 16 via a graphical user interface element, such as a pop-up window, notes tab, or other graphical data entry means, for selecting the particular project, diagram or model, and then for entering the appropriate descriptor.

As a result of these levels of attributes, a given model is identified by its own attributes, the attributes of its diagram, and the attributes of the diagram's project. By storing and organizing these model attributes in the various index structures 26, 28, 30 of the model repository 24, a much finer granularity for searching is provided.

FIG. 3 is a preferred data structure for a main-type index 26 that is part of the model repository 24 shown in FIG. 1. The main-type index 26 is structured as a table. The table includes a first column 40 in which the model is identified, and a plurality of other columns 42A, 42B, . . . , 42N, in which a plurality of attributes are specified. If the model's identification is not unique within the model repository, then an additional column is used to identify the project for which the model was generated. As noted above, each attribute is specified by a variable-value pair. The variables are listed in the first row of the table as Attribute A1, Attribute A2, Attribute A3, . . . , Attribute M1. The values for a given model are then set forth in the cells of the table for the row that is identified by the particular model's identification (and project identification, if necessary). The model names 44 preferably include an initial numerical identifier, such as "000" or "001", which identifies the diagram with which the particular model is associated.

In principle, the main-type index 26 could be constructed using the variables for every attribute associated with the models stored in the model repository 24. For practical reasons, however, the model repository administrator 14 preferably selects a subset of the attributes in order to construct the index, where the subset represents the attributes that end-users 16 most likely would utilize in order to conduct a search. Preferably, in the model repository's configuration subfolder, the model repository administrator 14 lists in the columns Info_user.text file the subset of human-defined descriptors that are to be used in the main index, and in the Columns Info_system.text file the subset of data-mining-application-defined attributes that are to be used in the main index. In addition, the model repository administrator 14 could decide to build more than one main-type index 26 for the model repository 24. Having more than one main index 26 would be useful if the search strategies employed by users can be grouped into several categories. In this situation, there could be one main-type index 26 per search category, with the attributes in that index being the ones that are useful in that category of search.

FIG. 4 is one of two preferred data structures 28A and 28B for a tree-type index 28 that is part of the model repository 24 shown in FIG. 1. Like the main-type index 26, the tree-type index 28A is organized as a table. The first column of the table 50 identifies the model 54. If the model's identification is not unique within the model repository, then an additional column is used to identify the project for which the model was generated. The remaining columns 52A, 52B, 52C, . . . , 52N set forth a plurality of attributes that are specific to the models associated with the tree-type index. These models were generated using a decision tree algorithm in the data mining application 18. For the tree-type index 28A, these special attributes are called the splitting variables. The intersection of a row and column in the tree-type index 28A is a cell that indicates whether or not (Yes or No, 1 or 0) a particular splitting variable is used in a particular model.

A model that results from a decision tree analysis identifies the variables that enable groups to be identified within the data. The records/observations within a group have similar behavior with respect to a target variable. For example, in a sales analysis, the target variable might be the one that contains the total amount of the sale. The variables that define the groups in the decision tree analysis are called predictor variables. The predictor variables that are most important to the analysis are called the splitting variables. It is these splitting variables that are listed in the tree-type index 28. The other predictor variables describe splits that are too trivial to matter to the outcome of the analysis.

The tree-type index 28A is preferably constructed using every splitting variable in the model repository 24. There are preferably two formats for the tree-type index 28. The format that is most comfortable for people to work with (such as, index 28A), if browsing the index, may or may not be the format that gives the best performance (such as, index 28B) to an application that may be automatically searching for and retrieving models from the model repository 24.

The first format 28A is shown in FIG. 4, as described above. The second format 28B is a table that has as many rows per model as the model has splitting variables. This second format 28B is shown in FIG. 5, and includes two columns, a first column 60 that identifies the model, and a second column 62 that identifies the splitting variable. If the model's identification is not unique within the model repository, then an additional column is used to identify the project for which the model was generated. In this second format, if a model has four splitting variables, then the model has four rows in the table.

If the number of rows in the tree-type index 28 becomes too large for efficient searching, then an additional mini-index 30 can be provided in the model repository 24. The mini-index 30 contains a list of the names of all the splitting variables in all the models. In the mini-index 30, each splitting variable name appears only once. In the tree-type index 28, each splitting variable name may appear many times. Thus, the mini-index 30 is an index to the tree-type index 28. If the mini-index 30 is searched first, and the splitting variable that is needed is not there, then there is no need to search the tree-type index 28, thus making the search process more efficient.

Figure 6:
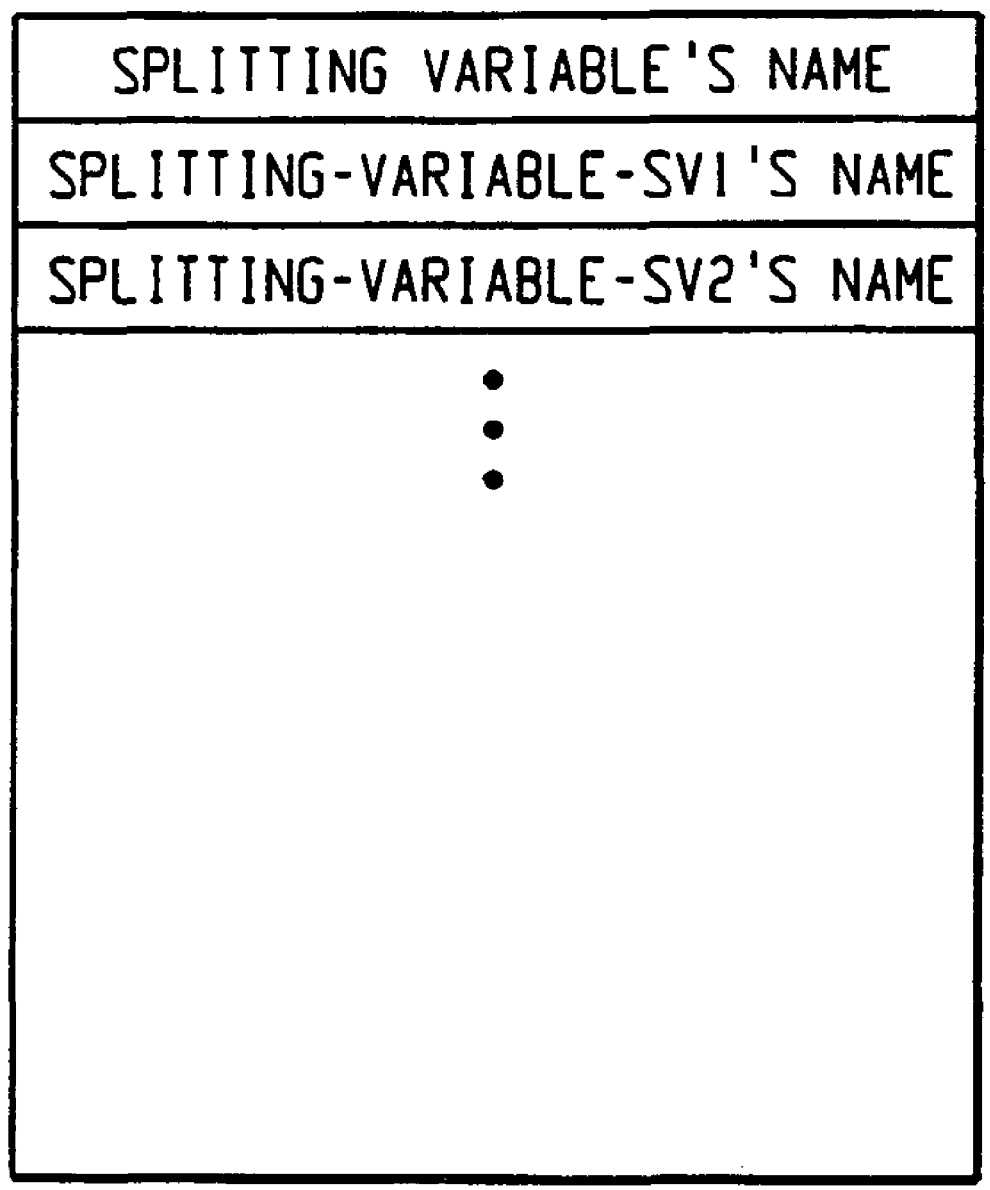
FIG. 6 is a preferred structure for a mini-index that is part of the model repository shown in FIG. 1.

FIG. 6 is a preferred data structure for a mini-index 30 that is part of the model repository 24 shown in FIG. 1. The mini-index is a table. The table includes one column, which identifies the name of a splitting variable that is in at least one of the models in the model repository.

Figure 7B:
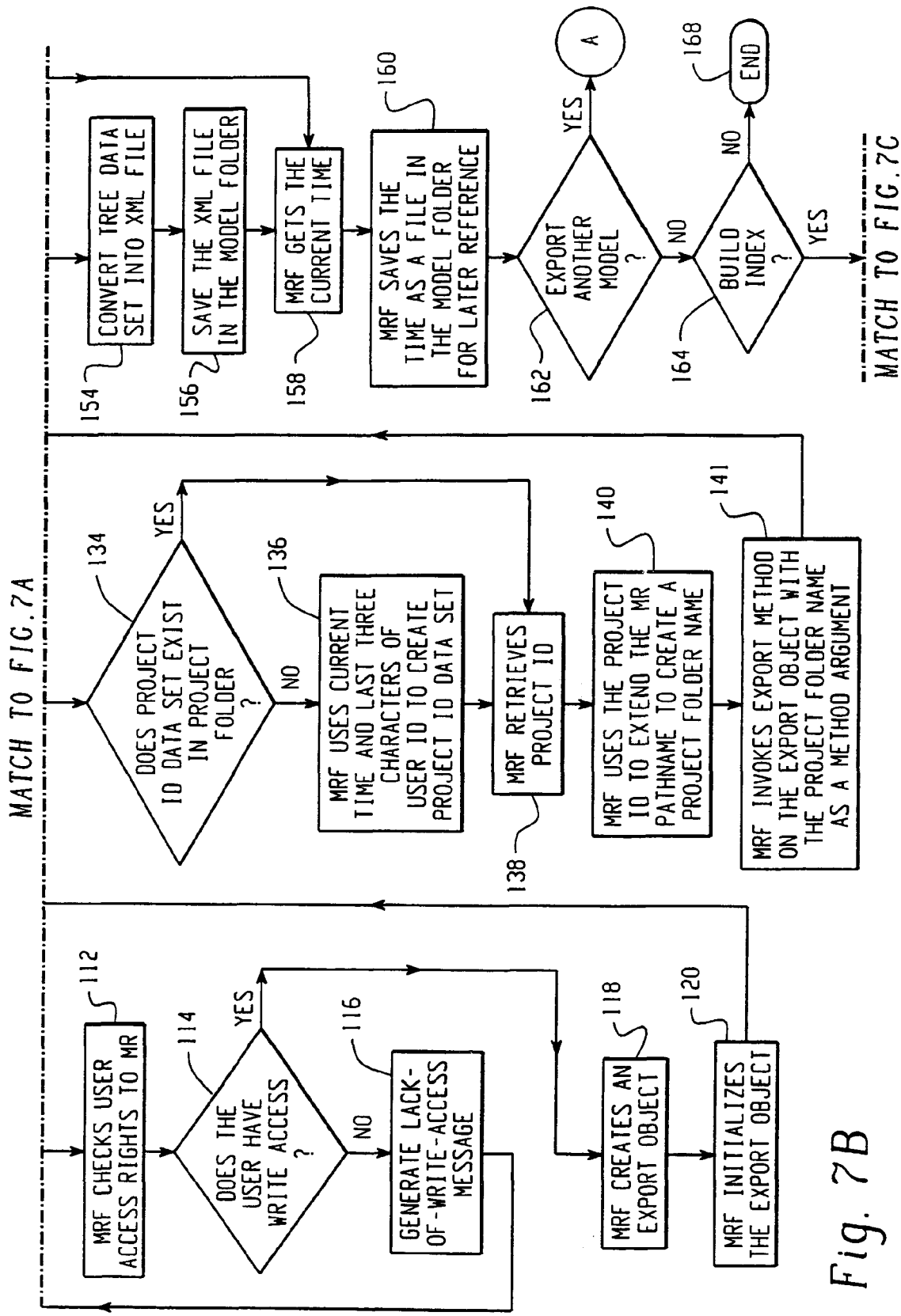
Figure 7C:
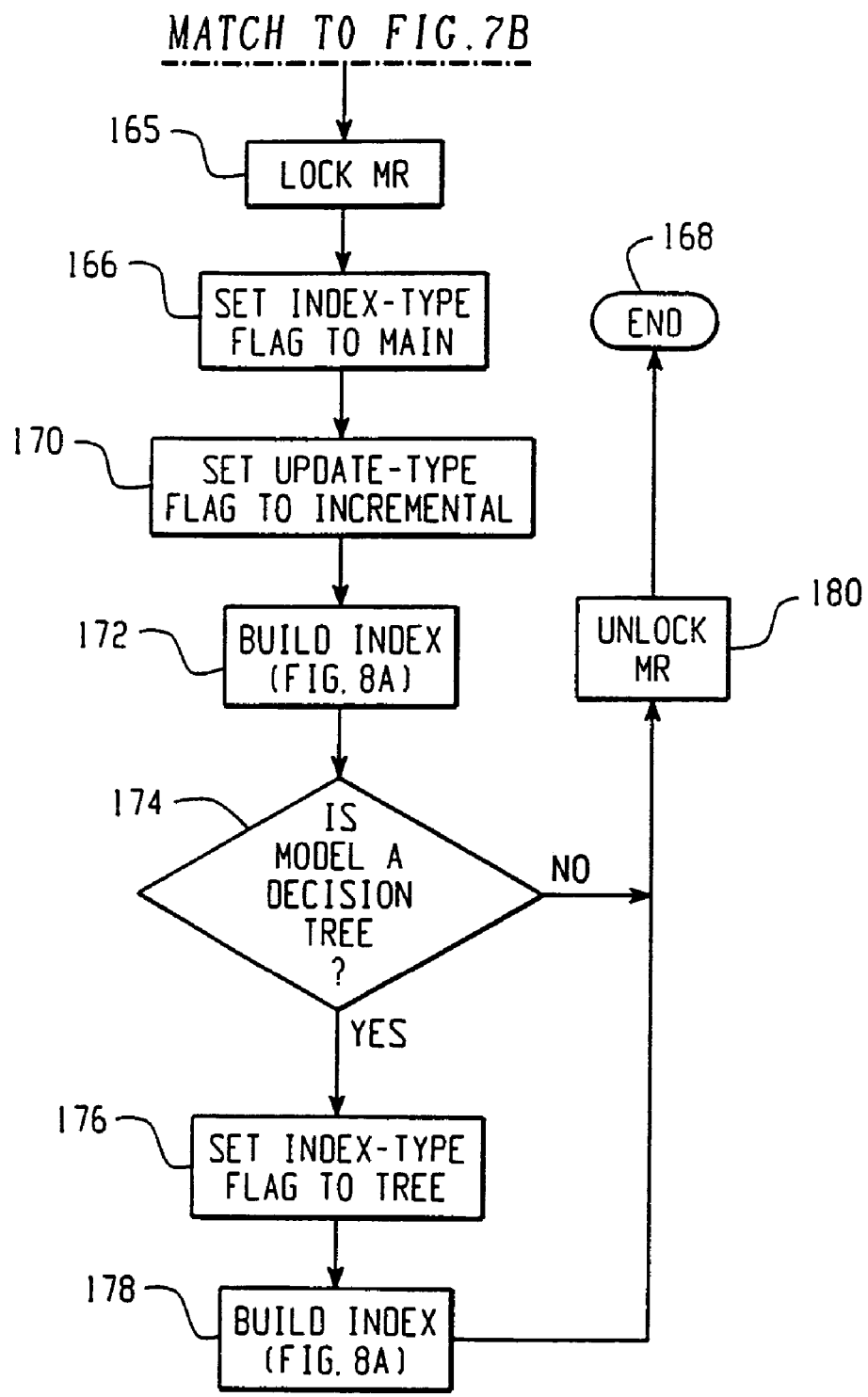

FIGS. 7A-7C are flow charts showing a preferred series of steps for exporting a model to the model repository 24 shown in FIG. 1. As noted above, these model exportation steps 100-180 are preferably carried out by the model repository facility 18A that is integrated into the data mining application 18.

The model exportation process begins at 100. At step 101, a model creator 12 creates one or more data mining models using the data mining application 18. These models 22A, 22B, 22C are then stored in one or more project folders 20 associated with the data mining application 18. Typically, each model creator 12 has his or her own folder, or set of folders, where he or she stores models he or she has created. The project folder has a name, which may or may not be unique. If a model has been exported from the folder, the project also has an identification that is unique. Having created a model, or set of models, the model creator 12 may then add model descriptor attributes to the models at step 102. These model attributes can be associated with the models at one or more of the levels defined in the structure of the model repository 24.

In a preferred embodiment, the model repository 24 is structured into three levels, the project level, the diagram level, and the model level. In step 102, a model creator can associate one or more model attributes with a model in the project folder 20 at any of these levels. Note also that the data mining application 18, or, alternatively, the model repository facility 18A, may also associate various attributes with the models at each of the various structural levels. In this manner, there are automatic attributes, which are associated by the system software, and manual attributes, which are associated by one or more of the system users.

At step 104, the user then compares models stored in the project folder 20 in order to identify a particular model to export to the model repository 24. The user then selects a particular model at step 106. Having selected the model to export, at step 108 the user then specifies the pathname of the model repository 24 to which the selected model is to be exported. This step is needed when the MRF 18A includes more than one model repository 24. In this case, the user needs to supply an address, or pathname, of the particular model repository 24.

Once the pathname is selected, the user then clicks on an export button at step 110. The export button is preferably a graphical user interface element that is integrated into the MRF 18A in order to instruct the MRF 18A to proceed with the exportation process. Alternatively, the export function could be initiated from a pull-down menu or via some other software selection process. After the user selects the export button at step 110, the MRF 18A then checks whether this particular user has the appropriate access rights to the model repository 24 that was specified via the pathname. As described above, the model repository administrator 14 controls access rights (both read and write) to the model repository 24 in order to ensure that only authorized users can access and operate the system. Thus, at step 114, the MRF 18A determines whether this user has write access rights to the selected model repository 24. If the user does have write access rights, then control passes to step 118, and the export process continues. If, however, the user does not have the appropriate access rights, then control passes to step 116 and a "lack-of-write-access" message is displayed to the user indicating that the user is not able to export models to the selected model repository 24. From step 116, control reverts back to step 108, and the user is then presented with the opportunity to select another model repository 24 to which he or she may have the appropriate access rights.

Assuming that the user does have the appropriate access rights, control then passes to step 118, where the MRF 18A creates an export object. The export object is preferably provided by the data mining application 18, and is a software mechanism used to move information from the model stored in a particular project folder 20 to the model repository 24. At step 120, the MRF 18A initializes the export object. At step 122, the system determines whether a configuration subfolder exists in the model repository 24. If so, then control passes to step 126. If not, however, then at step 124 the MRF 18A creates a configuration subfolder within the model repository 24, and populates this subfolder with a set of default configuration files. This step is carried out preferably only the first time that a model is exported to the model repository 24.

At step 126, the MRF 18A retrieves information from a "results-option" configuration file that is in the configuration subfolder in the model repository 24. This file instructs the MRF 18A as to what information from the model should be exported to the model repository 24. The model may contain numerous types of result information from the data mining run that are not necessary or desirable (for space reasons) to export into the model repository 24. By using this export results-option configuration file, the model repository administrator 14 can control the type and amount of model information that is exported to the model repository 24. The MRF 18A then sets the results export property of the export object at step 128. The property effectively controls the information being exported into the model repository 24 for the selected model.

Having configured the export object, at step 130 the MRF 18A obtains from the current model the diagram identification (such as "000", "001", etc.) and also the model identification, in order to generate a model folder name to be used in the model repository 24. At step 132, the MRF 18A then obtains from the current model the project identification. If the project identification exists in the project folder 20 at step 134, then control passes to step 138. If, however, the project identification is not already part of the project folder 20, then at step 136 the MRF 18A takes the current export time and the last three characters of the user's identification and creates the project identification.

At step 138, the MRF 18A retrieves the existing, or new, project identification. The project identification is then used by the MRF 18A to extend the selected model repository 24 pathname in order to create a project folder name to be used within the model repository 24. At step 141, the MRF 18A then invokes an export method on the configured export object with the newly extended pathname including the project folder as a method argument to the export method. It is this export method that actually copies the non-descriptor model information (as permitted by the results-option configuration file) from the project folder 20 to the model repository 24.

Following this exportation step, the MRF 18A then reads (or extracts) from the project folder 20 the various attributes (also referred to herein as descriptors) for the three levels associated with the preferred model repository structure—project, diagram and model—at step 142. These attributes are typically stored in the form of "notes" that are attached (or associated) with the project, diagram, and selected model in the project folder 20. These "notes" may contain information in addition to the project, diagram, and model descriptor attributes, and thus at step 146, the MRF 18A filters the notes by eliminating all entries that do not begin with the prefix "MR:". This prefix, "MR:", is indicative of a descriptor attribute, and thus can be used by the MRF 18A to identify and extract all of the model's descriptor attributes from the notes. At step 148, the model descriptor attributes from the three levels are then concatenated into a single file. This file is then saved in the model repository 24 at step 150 in the model's folder.

Each model that is exported to the model repository 24 is stored according to the preferred three-level organization shown in FIG. 2. The lowest level of organization, the model level, is a folder in which several files can be stored. The information that was exported from the model in step 141 is one such file. The concatenated attribute file from step 148 is also stored in this same model folder.

At step 152, the system determines whether this particular model was generated using a decision tree algorithm. If not, then control passes to step 158. If so, however, then at step 154, the MRF 18A converts the tree data stored in the model folder in the model repository 24 into an extensible markup language (XML) file and also saves this XML file in the model folder in the model repository 24. This conversion to XML step is carried out so that users who access the model (or applications that may access the model) can easily interpret and graphically visualize the decision tree structure that generated the model.

At step 158, the MRF 18A then obtains the current time. This information is then saved in the model folder at step 160 for later reference (see, steps 242 and 249 of FIGS. 8B and 8C). At step 162, the MRF 18A determines if the user desires to export another model. If so, then control reverts back to step 106, where the user selects another model to export to the model repository 24. If not, however, then control passes to step 164, and the MRF 18A determines from the user 12 whether the indexes associated with the model repository 24 should be rebuilt in order to account for the newly exported models. If the user decides not to rebuild the indexes, then the export method ends at step 168.

If, however, the user desires to immediately update the indexes, then control passes to steps 165-180. At step 165, the model repository is locked. That is, no models can be exported while the indexes are being updated. At step 166, an index-type flag is set to "main." At step 170, an update-type flag is set to "incremental". By setting the index-type flag to "main" and the update-type flag to "incremental," the system will perform an incremental re-build (as opposed to a complete re-build) of the main index in step 172 in order to include the indexing information associated with the newly-exported models. The preferred build index method is further detailed below with reference to FIGS. 8A-8C.

Having incrementally updated the main index, step 174 determines whether at least one of the newly-exported models was generated using the decision tree algorithm. If not, then the export method ends at step 168. If so, however, then control passes to step 176, where the index-type flag is set to "tree." At step 178 the build index steps (that are set forth in FIGS. 8A-8C) update the tree-type index 28 and the associated mini-index 30. At step 180, the model repository is unlocked. Control then passes to step 168 and the export method ends.

Figure 8A:
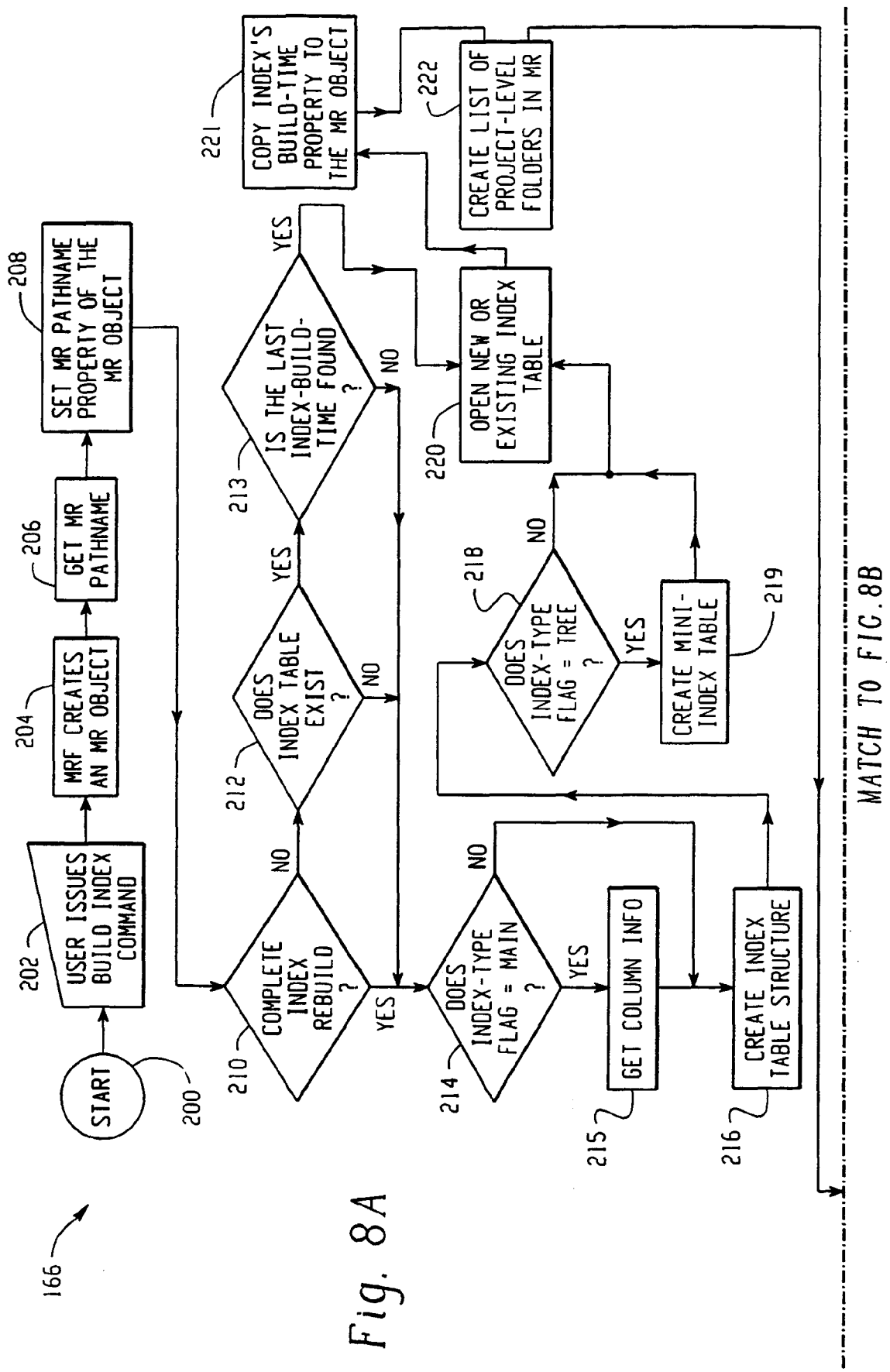
FIGS. 8A-8C are flow charts showing a preferred series of steps for generating the main index and the tree-type index that are part of the model repository shown in FIG. 1.
Figure 8B:
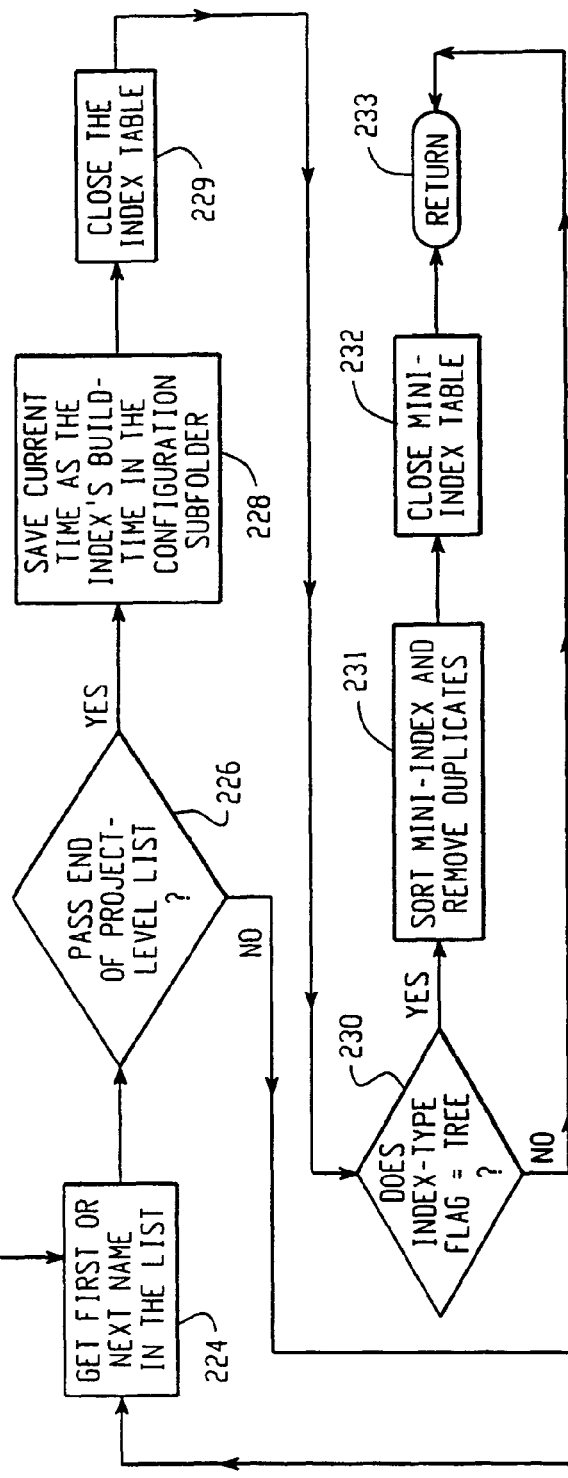
Figure 8C:
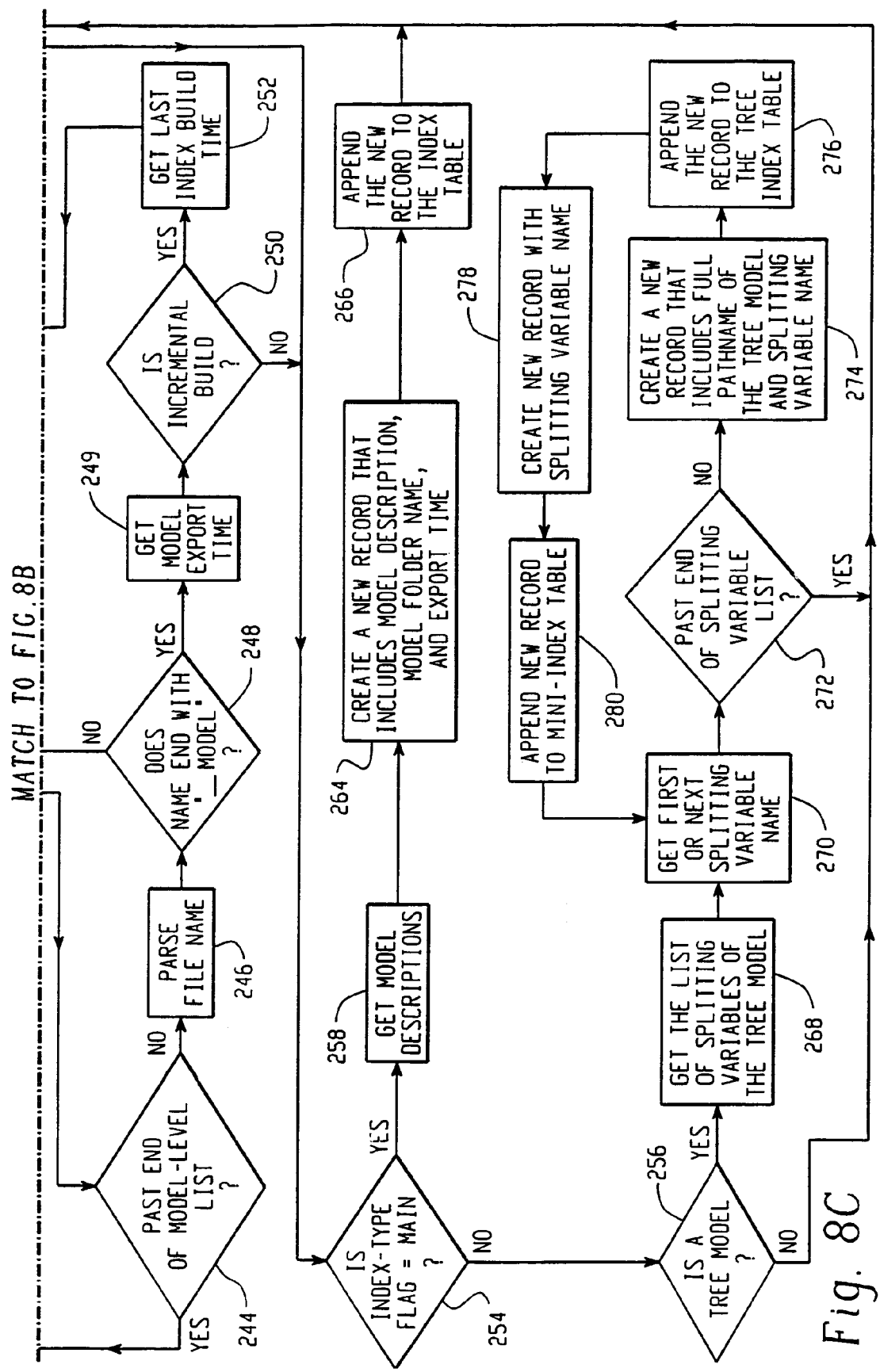

FIGS. 8A-8C are flow charts showing a preferred series of steps for generating the main index 26 and the tree-type index 28 and mini-index 30 that are part of the model repository 24 shown in FIG. 1. The method begins at step 200. At step 202, the system user, which could be the model creator 12 or the model repository administrator 14, issues a build index command. (For example, steps 172 and 178 in FIG. 7C issue this command.) In response to this command, the MRF 18A then creates a new model repository (MR) object. The MR object is used by the MRF 18A to accomplish the re-build of the particular indexes in the selected model repository 24. (For example, steps 166 and 176 in FIG. 7C request an update of a particular index.) At step 206, the system obtains the MR pathname for the model repository 24 whose indexes are to be rebuilt. Following this step, the MR object is configured to interact with the appropriate model repository 24 at step 208 by setting the pathname property of the MR object using the MR pathname from step 206.

Control then passes to step 210, and the MRF 18A determines whether the build index command is for a complete index rebuild, or for an incremental rebuild. This determination step is accomplished by examining the update-type flag. (For example, step 170 in FIG. 7C sets that flag.) If the update-type flag is set to incremental, then control passes to step 212, otherwise control passes to step 216.

At step 212, the system determines whether the index table(s) exists in the selected model repository 24. If not, then control passes to step 214. If the index table does exist, then control passes to step 213. At step 213, the system then determines whether information regarding the last time that the index was rebuilt is present in the model repository 24. If not, then control passes to step 214, and if so, control passes to step 220.

Thus, if the index is being completely rebuilt (as determined in step 210), or if the index table does not exist in the model repository (as determined in step 213), or if the information regarding the last index rebuild time is not present (as determined in step 214), then control passes to step 214. At step 214, the system determines whether the index being updated is the main index. If so, the system obtains the lists that the model repository administrator 14 specified of the attributes that are to be used in the main index, and then control passes to step 216. At step 216, a new index table structure is created for the selected model repository 24. This new index table structure is the main-type index 26 or the tree-type index 28. From step 216, the MRF 18A then determines whether the index being updated is the tree index 28 (and thus also the mini-index 30). If so, then at step 219, the system also creates the index structure for the mini-type index 30. Control then passes to step 220.

At step 220, a new or existing index table is then opened, depending on whether the table was just created (by following steps 214-219), or was an existing table that is going to be incrementally updated (by flowing through steps 210, 212 and 213 to step 220). At step 221, the index's most recent build time is then copied to the MR object from the configuration subfolder in the model repository 24. As noted previously, the MR object is the software structure used by the MRF 18A to rebuild the indexes in the selected model repository 24.

At step 222, the MRF 18A then creates a list of the project-level folders 300 in the selected model repository. Control passes to step 224, and the first project-level folder name is then obtained from the project-level list. Step 226 determines whether all of the project-level folders in the project-level folder list have been examined. If so, then control passes to steps 228 through 233, which complete the index building process. If not, then potentially not all of the models in the various project folders have been indexed, and control passes to steps 234 through 280, which perform the indexing function for the individual models in the model repository.

Turning now to the individual indexing process (steps 234 through 280), at step 234 the selected project-level folder name is parsed into its components. Step 236 determines whether the parsed name is actually a project folder by determining whether the name ends with the project folder designator "_project." If the parsed name does not end with this designator, then the name is not a project folder name, and control passes back to step 224 in order to obtain the next project-level folder name from the project-level folder list. If the parsed name does end with this designator, however, then control passes to step 238.

At step 238, a list of model-level folders within the particular project folder is then created. This list is termed the model-level folder list. At step 240, the first name in the model-level folder list is then obtained. Step 244 then determines whether all of the names associated with the selected project folder have been examined. If so, then control passes back to step 224 in order to select the next name in the project-level folder list. If there are names remaining in the model-level folder list for this particular project folder, however, then control passes to step 246.

Step 246 parses the currently selected model-level folder name. Following this step, step 248 then determines whether the parsed name is actually a model by determining whether the name ends with the model designator "_model." If the parsed name does not end with this designator, then the name is not a model folder name, and control passes back to step 240 in order to obtain the next name from the model-level folder list. If the parsed name does end with this designator, however, then control passes to step 249.

At step 249, the model export time is obtained. The export time was stored along with the model in steps 158 and 160 of the model exportation process detailed in FIG. 6. Step 250 of the index building method then determines whether the build is an incremental build or a full re-build. If it is not an incremental build, then control passes to step 254. If the current operation is an incremental build, however, then at step 252 the last (most recent) index build time is obtained, and at step 242 this time is then compared to the export time. If the export time of the selected model is earlier than the last index build time (meaning that this model's attribute information has already been placed into the index structure(s)), then control passes to step 240, and the next model is selected from the model-level folder list. If the export time of the selected model is later than the last index build time (meaning that this model's attribute information has not been placed into the index structure(s)), then control passes to step 254.

Steps 254 through 280 perform the index build operation for the individual models in the model-level folder list. At step 254, the method determines whether the index that is being updated is the main-type index 26. If so, then control passes to step 258, and if not, then control passes to step 256. If it is not the main-type index 26 that is being updated, then at step 256, the MRF 18A determines whether the model is a decision tree model. If it is a decision tree model, then control passes to step 268, and if it is not a decision tree model or a model associated with the main index 26, then control passes back to step 240 in order to obtain the next model from the model-level folder list.

At step 258, the model descriptions (or attributes) that are associated with the selected model and permitted by the column info in step 215 are obtained from the model in the model repository 24. Step 264 then creates a new data record that includes those model attributes, the model's folder name, and the export time. At step 266, this new data record is then appended to the main-type index 26, and results in a new row in the main index table 26, as shown in FIG. 3.

At step 268, the splitting variables associated with the model are obtained from the model in the model repository 24. These splitting variables are then organized into a splitting variable list. The first splitting variable is obtained from the splitting variable list at step 270. Step 272 then determines if all the splitting variables for this model have been indexed. If so, then control passes back to step 240 to obtain the next model in the model-level folder list. If not, then at step 274 a new data record is created that includes the full pathname of the model and the selected splitting variable name from step 270. At step 276, this new data record is then appended to the tree-type index 28, and results in a new row in the tree index table, as shown in FIG. 5. Alternatively or additionally, the tree index table shown in FIG. 4 could be formed by creating a new data record that includes the full pathname of the model and an indication of which splitting variables associated with the tree-type index 28 are also present in the selected model. Following step 276, a record is created at step 278 that includes the selected splitting variable name from the splitting variable list. At step 280, this new data record is then appended to the mini-index table 30. Control then reverts to step 270 in order to obtain the next splitting variable for the selected model.

Turning back to steps 228 through 233, these steps are executed when step 226 determines that all of the project folders in the project-level folder list have been analyzed, and the corresponding models within these project folders have been indexed according to steps 254 through 280. At step 228, the current time is saved as the index's build time in the configuration subfolder of the model repository 24. The index's table is then closed at step 229 and saved to the model repository 24. At step 230, the method determines whether the index being updated is the tree index. If not, then the index build process ends at step 233. If the index being updated is the tree index, however, then at step 231 the mini-index 30 is sorted and any duplicate splitting variable entries are removed. This removal is done because the mini-index 30 to the tree-type index 28 is used only to determine whether there is some model in the model repository 24 that includes a particular splitting variable. Thus, only one entry is needed per splitting variable in the mini-index 30, and any duplicate entries can be discarded. At step 232 the mini-index table 30 is closed and saved to the model repository 24, and at step 233 the index build method ends.

The preferred embodiment described with reference to the drawing figures is presented only to demonstrate an example of the invention. Additional, and/or alternative, embodiments of the invention would be apparent to one of ordinary skill in the art upon reading this disclosure.

What is claimed:

1. A method for updating statistical data models in a model repository organized into three levels including a project level, a diagram level, and a model level, the model repository having one or more index structures, each index structure including one or more attributes associated with the statistical data models, the one or more attributes describing statistical data model components contained within the statistical data models, the method comprising:
   receiving, using one or more processors, a statistical data model; and
   updating, using the one or more processors, a model repository index structure such that:
      when updating a main-type index structure, a new record is created and appended to the main-type index structure, the new record including the one or more model attributes, a model folder name, and an export time, and
      when updating a tree-type index structure, a list is created using any splitting variables associated with the model, wherein a splitting variable is a predictor variable, wherein a predictor variable defines a group within a tree-type index structure, and wherein a new record is created and appended to the tree-type index structure, the new record including a model tree path name and the first splitting variable on the splitting variable list.

2. The method of claim 1, wherein the tree-type index structure is constructed using every splitting variable associated with a statistical data model in the model repository.

3. The method of claim 1, wherein the tree-type index structure has a corresponding mini-index structure, and wherein the mini-index structure is searched before the tree-type index structure is searched.

4. The method of claim 3, wherein each splitting variable can appear one or more times in the tree-type index structure, and wherein each splitting variable can appear only once in the mini-index structure.

5. The method of claim 1, wherein the one or more model attributes are assigned at the project level, the diagram level, or the model level.

6. A system for updating statistical data models in a model repository organized into three levels including a project level, a diagram level, and a model level, the model repository having one or more index structures, each index structure including one or more attributes associated with the statistical data models, the one or more attributes describing statistical data model components contained within the statistical data models, the system comprising:
   one or more processors;
   one or more computer-readable storage mediums containing instructions configured to cause the one or more processors to perform operations including:
   receiving a statistical data model; and
   updating a model repository index structure such that:
      when updating a main-type index structure, a new record is created and appended to the main-type index structure, the new record including the one or more model attributes, a model folder name, and an export time, and
      when updating a tree-type index structure, a list is created using any splitting variables associated with the model, wherein a splitting variable is a predictor variable, wherein a predictor variable defines a group within a tree-type index structure, and wherein a new record is created and appended to the tree-type index structure, the new record including a model tree path name and the first splitting variable on the splitting variable list.

7. The system of claim 6, wherein the tree-type index structure is constructed using every splitting variable associated with a statistical data model in the model repository.

8. The system of claim 6, wherein the tree-type index structure has a corresponding mini-index structure, and wherein the mini-index structure is searched before the tree-type index structure is searched.

9. The system of claim 8, wherein each splitting variable can appear one or more times in the tree-type index structure, and wherein each splitting variable can appear only once in the mini-index structure.

10. The system of claim 6, wherein the one or more model attributes are assigned at the project level, the diagram level, or the model level.

11. A computer-program product for updating statistical data models in a model repository organized into three levels including a project level, a diagram level, and a model level, the model repository having one or more index structures, each index structure including one or more attributes associated with the statistical data models, the one or more attributes describing statistical data model components contained within the statistical data models, the computer-program product being tangibly embodied in a machine-readable storage medium, and including instructions operable to cause a data processing apparatus to:
   receive a statistical data model; and
   update a model repository index structure such that:
      when updating a main-type index structure, a new record is created and appended to the main-type index structure, the new record including the one or more model attributes, a model folder name, and an export time, and
      when updating a tree-type index structure, a list is created using any splitting variables associated with the model, wherein a splitting variable is a predictor variable, wherein a predictor variable defines a group within a tree-type index structure, and wherein a new record is created and appended to the tree-type index structure, the new record including a model tree path name and the first splitting variable on the splitting variable list.

12. The computer-program product of claim 11, wherein the tree-type index structure is constructed using every splitting variable associated with a statistical data model in the model repository.

13. The computer-program product of claim 11, wherein the tree-type index structure has a corresponding mini-index structure, and wherein the mini-index structure is searched before the tree-type index structure is searched.

14. The computer-program product of claim 13, wherein each splitting variable can appear one or more times in the tree-type index structure, and wherein each splitting variable can appear only once in the mini-index structure.

15. The computer-program product of claim 11, wherein the one or more model attributes are assigned at the project level, the diagram level, or the model level.

* * * * *